US009216926B2

United States Patent
Riman et al.

(10) Patent No.: US 9,216,926 B2
(45) Date of Patent: Dec. 22, 2015

(54) SYNTHETIC FORMULATIONS AND METHODS OF MANUFACTURING AND USING THEREOF

(75) Inventors: Richard E Riman, Belle Mead, NJ (US); Thomas E. Nye, Palmerton, PA (US); Vahit Atakan, West Windsor, NJ (US); Cekdar Vakifahmetoglu, Piscataway, NJ (US); Qinghua Li, Edison, NJ (US); Ling Tang, Berkeley Heights, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 311 days.

(21) Appl. No.: 13/491,098

(22) Filed: Jun. 7, 2012

(65) Prior Publication Data

US 2012/0312194 A1 Dec. 13, 2012

Related U.S. Application Data

(60) Provisional application No. 61/495,152, filed on Jun. 9, 2011.

(51) Int. Cl.
*C04B 14/28* (2006.01)
*C04B 14/30* (2006.01)
(Continued)

(52) U.S. Cl.
CPC .............. *C04B 28/10* (2013.01); *C04B 28/182* (2013.01); *C04B 28/184* (2013.01); *Y02W 30/91* (2015.05);
(Continued)

(58) Field of Classification Search
CPC ...... C04B 14/043; C04B 14/28; C04B 14/30; C04B 7/24; C04B 7/26; C04B 12/00
USPC .......................... 106/738, 801, 772; 423/220
See application file for complete search history.

(56) References Cited

U.S. PATENT DOCUMENTS 3,632,624 A    1/1972  Anderson
4,350,567 A    9/1982  Moorehead et al.
(Continued)

FOREIGN PATENT DOCUMENTS

BE    1006908 A3    1/1995
EP    1142629 A1    10/2001
(Continued)

OTHER PUBLICATIONS

Monkman et al., "Assessing the Carbonation Behavior of Cementitious Materials", Journal of Materials in Civil Engineering, Nov. 2006, pp. 768-776.
(Continued)

*Primary Examiner* — Paul Marcantoni
(74) *Attorney, Agent, or Firm* — McKenna Long & Aldridge LLP

(57) ABSTRACT

A method for producing a reaction product including at least one synthetic formulation that carbonates sufficiently, said method comprising: providing a first raw material, having a first concentration of M; providing a second raw material, having a second concentration of Me; and mixing the first raw material and the second raw material to produce a reaction product that includes at least one synthetic formulation having the general formula $M_aMe_bO_c$, $M_aMe_b(OH)_d$, $M_aMe_bO_c(OH)_d$ or $M_aMe_bO(OH)_d \cdot (H_2O)_e$, wherein M comprises at least one metal that can react to form a carbonate and Me is at least one element that can form an oxide during the carbonation reaction, wherein the at least one synthetic formulation is capable of undergoing a carbonation reaction, and wherein the at least one synthetic formulation is capable of undergoing volume change during the carbonation reaction.

20 Claims, 4 Drawing Sheets

$Ca(OH)_2:SiO_2 = 1:1$, Water/Solid =20:1, pH=13 (0.1M KOH), T=225 °C, time =4 h

(51) Int. Cl.
*C04B 28/10* (2006.01)
*C04B 28/18* (2006.01)

(52) U.S. Cl.
CPC .............. *Y02W 30/92* (2015.05); *Y02W 30/93* (2015.05); *Y02W 30/94* (2015.05); *Y02W 30/95* (2015.05); *Y02W 30/97* (2015.05)

(56) References Cited

U.S. PATENT DOCUMENTS

| | | | |
|---|---|---|---|
| 4,501,618 | A | 2/1985 | Gebhard et al. |
| 4,595,465 | A | 6/1986 | Ang et al. |
| 5,252,127 | A | 10/1993 | Pichat |
| 5,298,475 | A | 3/1994 | Shibata et al. |
| 5,395,561 | A | 3/1995 | Ukawa et al. |
| 5,502,021 | A | 3/1996 | Schuster |
| 5,518,540 | A | 5/1996 | Jones, Jr. |
| 5,650,562 | A | 7/1997 | Jones, Jr. |
| 5,744,078 | A | 4/1998 | Soroushian et al. |
| 5,769,940 | A | 6/1998 | College |
| 5,779,464 | A | 7/1998 | Fan et al. |
| 5,830,815 | A | 11/1998 | Wagh et al. |
| 5,897,702 | A | 4/1999 | Thomson et al. |
| 5,958,353 | A | 9/1999 | Eyal |
| 5,965,201 | A | 10/1999 | Jones, Jr. |
| 5,987,704 | A | 11/1999 | Tang |
| 5,997,629 | A | 12/1999 | Hills |
| 6,264,736 | B1 | 7/2001 | Knopf et al. |
| 6,271,172 | B2 | 8/2001 | Ohashi et al. |
| 6,447,437 | B1 | 9/2002 | Lee et al. |
| 6,648,551 | B1 | 11/2003 | Taylor |
| 6,787,023 | B1 | 9/2004 | Mohr et al. |
| 7,067,456 | B2 | 6/2006 | Fan et al. |
| 7,125,530 | B2 | 10/2006 | Biedenkopf et al. |
| 7,132,090 | B2 | 11/2006 | Dziedzic et al. |
| 7,141,093 | B2 | 11/2006 | Charette |
| 7,314,847 | B1 | 1/2008 | Siriwardane |
| 7,390,444 | B2 | 6/2008 | Ramme et al. |
| 7,399,339 | B2 | 7/2008 | Fan et al. |
| 7,618,606 | B2 | 11/2009 | Fan et al. |
| 7,666,374 | B2 | 2/2010 | Grochowski |
| 7,722,842 | B2 | 5/2010 | Park et al. |
| 7,753,618 | B2 | 7/2010 | Constantz et al. |
| 7,771,684 | B2 * | 8/2010 | Constantz et al. ............ 423/220 |
| 7,795,175 | B2 | 9/2010 | Olah et al. |
| 7,820,591 | B2 | 10/2010 | Ryu et al. |
| 7,914,685 | B2 * | 3/2011 | Constantz et al. ............ 210/702 |
| 8,333,944 | B2 * | 12/2012 | Constantz et al. ............ 423/225 |
| 8,721,784 | B2 * | 5/2014 | Riman et al. .................. 106/713 |
| 2004/0038065 | A1 | 2/2004 | Francis et al. |
| 2004/0213705 | A1 | 10/2004 | Blencoe et al. |
| 2006/0185560 | A1 | 8/2006 | Ramme et al. |
| 2007/0020955 | A1 | 1/2007 | Song et al. |
| 2007/0149398 | A1 | 6/2007 | Jones et al. |
| 2008/0066651 | A1 | 3/2008 | Park |
| 2008/0245274 | A1 | 10/2008 | Ramme |
| 2009/0020044 | A1 | 1/2009 | Constantz et al. |
| 2009/0081093 | A1 | 3/2009 | Comrie |
| 2009/0104349 | A1 | 4/2009 | Hills et al. |
| 2009/0142578 | A1 | 6/2009 | Riman et al. |
| 2009/0143211 | A1 | 6/2009 | Riman et al. |
| 2009/0304566 | A1 | 12/2009 | Golden et al. |
| 2010/0024686 | A1 | 2/2010 | Constantz et al. |
| 2010/0132549 | A1 | 6/2010 | Yaghi et al. |
| 2010/0132591 | A1 | 6/2010 | Constantz et al. |
| 2010/0135882 | A1 | 6/2010 | Constantz et al. |
| 2010/0178308 | A1 | 7/2010 | Iwasa et al. |
| 2010/0247410 | A1 | 9/2010 | Constantz et al. |

FOREIGN PATENT DOCUMENTS

| | | | |
|---|---|---|---|
| JP | 2001253785 A | | 9/2001 |
| JP | 2006213559 | | 8/2006 |
| WO | 0038910 A1 | | 7/2000 |
| WO | 2005070521 A1 | | 8/2005 |
| WO | 2007106883 A2 | | 9/2007 |
| WO | 2009132692 A1 | | 11/2009 |
| WO | 2009133120 A2 | | 11/2009 |
| WO | WO 2009/132692 | | 11/2009 |

OTHER PUBLICATIONS

Monkman et al., "Carbonated Ladle Slag Fines for Carbon Uptake and Sand Substitute", Journal of Materials in Civil Engineering, Nov. 2009, pp. 657-665.
Monkman et al., "Carbonation Curing of Slag-Cement Concrete for Binding CO2 and Improving Performance", Journal of Materials in Civil Engineering, Apr. 2010, pp. 296-304.
Liu et al., "Development of CO2 solidification method for recycling autoclaved lightweight concentrate waste", Journal of Material Science Letters in Civil Engineering, 2001, pp. 1791-1794.
Teramura et al., "New Building Material from Waste Concrete by Carbonation", Journal of Material Civil Engineering, Nov. 2000, pp. 288-293.
Shiomi et al., "Effect of Mechano-Chemical Treatment on Consolidation of CaSiO3 by Carbonation", J. Soc. Mat. Sci., Japan, vol. 51, No. 6, pp. 610-616, Jun. 2002.
Nakamura et al., "High Temperature Deformation and Dislocation Structure of a—Al2O3 Single Crystals", J. Soc. Mat. Sci., Japan, vol. 51, No. 6, pp. 617-621, Jun. 2002.
SciFinder Scholar database searched under "Cement-Carbonate-Carbon Dioxide", Jun. 29, 2007 pp. 1-993.
SciFinder Scholar database searched under "Hydrothermal Sintering", Aug. 23, 2007 pp. 1-16.
SciFinder Scholar database searched under "Carbon Dioxide in Cement", Oct. 10, 2007 pp. 1-2.
SciFinder Scholar database searched under "Cements/Geopolymers_Czech", Oct. 10, 2007 pp. 1-5.
SciFinder Scholar database searched under "Geopolymers and Carbon Dioxide", Oct. 10, 2007 pp. 1-8.
SciFinder Scholar database searched under "Geopolymers", Oct. 10, 2007 pp. 1-9.
SciFinder Scholar database searched under "Carbon Capture and Amine Sorbents", Jan. 3, 2008, pp. 1-70.
SciFinder Scholar database searched under "Carbon Capture and Calcium Carbonate", Jan. 3, 2008, pp. 1-31.
SciFinder Scholar database searched under "Carbon Capture and Calcium Sulfate", Jan. 3, 2008, pp. 1-6.
SciFinder Scholar database searched under "Carbon Capture and Ammonium Carbonate", Jan. 3, 2008, pp. 1-4.
SciFinder Scholar database searched under "C02 Capture, Carbonates and Chloride", Jan. 3, 2008, pp. 1-13.
SciFinder Scholar database searched under "Carbon Capture and Carbonates", Jan. 3, 2008, pp. 1-88.
SciFinder Scholar database searched under "Carbon Capture and FeCO3", Jan. 3, 2008, pp. 1-2.
SciFinder Scholar database searched under "Carbon Capture and Hydrothermal", Jan. 3, 2008, pp. 1-3.
SciFinder Scholar database searched under "Carbon Capture and Oxalate", Jan. 3, 2008, pp. 1-2.
SciFinder Scholar database searched under "Carbon Capture and Sequestration", Jan. 3, 2008, pp. 1-132.
SciFinder Scholar database searched under "Carbon Capture and Sintering", Jan. 3, 2008, pp. 1-61.
SciFinder Scholar database searched under "Carbon Capture and solid sorbents", Jan. 3, 2008, pp. 1-32.
SciFinder Scholar database searched under "Carbon Capture and Storage", Jan. 3, 2008, pp. 1-128.
SciFinder Scholar database searched under "Carbon Capture and MgC03", Jan. 4, 2008, pp. 1-3.
SciFinder Scholar database searched under "Oxalate-electrochemical", Jan. 14, 2008, pp. 1-2.
SciFinder Scholar database searched under "Oxalate for Sequestration", Jan. 14, 2008, pp. 1-4.
SciFinder Scholar database searched under "Oxalate—Texaco", Jan. 14, 2008, pp. 1-4.
SciFinder Scholar database searched under "Solar Oxalate", Jan. 14, 2008, pp. 1-2.

(56) References Cited

OTHER PUBLICATIONS

SciFinder Scholar database searched under "Carbonation of Concrete, restricted to 2000 and on", Jan. 21, 2008, pp. 1-417.
SciFinder Scholar database searched under "Slag and Carbon Dioxide", Jun. 17, 2008, pp. 1-768.
SciFinder Scholar database searched under "Slags-Carbon Dioxide-Construction Materials", Jun. 17, 2008, pp. 1-95.
SciFinder Scholar database searched under "Lime Cement—Carbon Dioxide", Jul. 2, 2008, pp. 1-98.
SciFinder Scholar database searched under "Hills—all papers", Nov. 30, 2010, pp. 1-27.
SciFinder Scholar database searched under "Hills", Nov. 30, 2010, pp. 1-13.
SciFinder Scholar database searched under "Teramura limited to carbonate", Nov. 30, 2010, pp. 1-11.
SciFinder Scholar database searched under "Teramura Work", Nov. 30, 2010, pp. 1-34.
SciFinder Scholar database searched under "Carbon Capture and Amine and MEA", Jan. 3, 2008, pp. 1-20.
SciFinder Scholar database searched under "Carbon Capture and K2CO3", Jan. 3, 2008, pp. 1-12.
SciFinder Scholar database searched under "Carbon Capture Na2C03", 101/03/2008, pp. 1-15.
SciFinder Scholar database searched under "Solidification of McC03", Jan. 4, 2008, pp. 1-2.
Klaus S. Lackner, "Carbon dioxide disposal in carbonate minerals", Energy Pergamon Press, Oxford, GB, vol. 20, No. 11, Jan. 1, 1995.

* cited by examiner

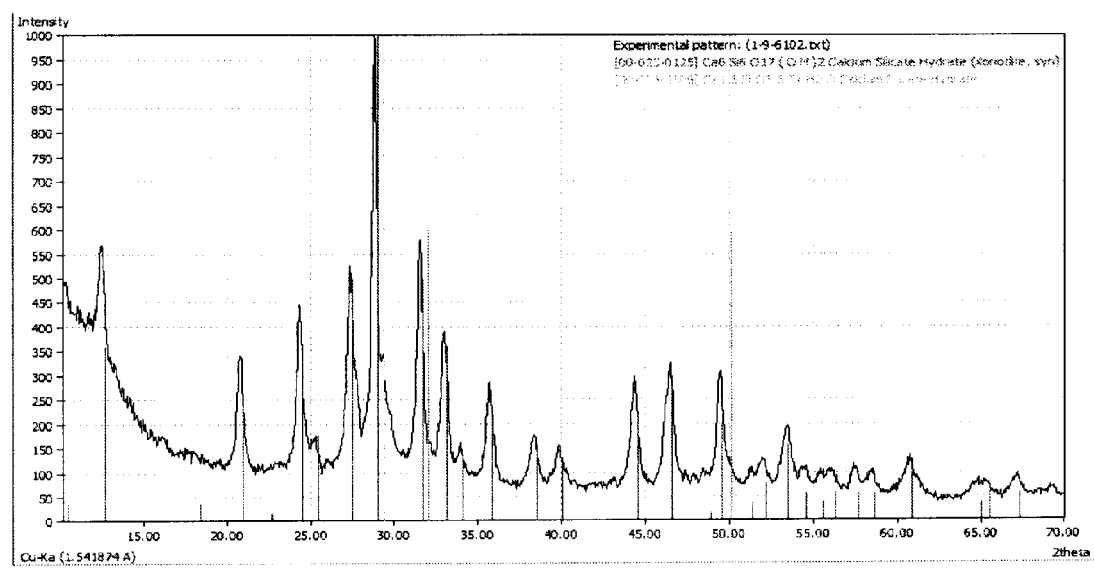
Figure 1. Ca(OH)$_2$:SiO$_2$ = 1:1, Water/Solid =20:1, pH=13 (0.1M KOH), T=225 °C, time =4 h

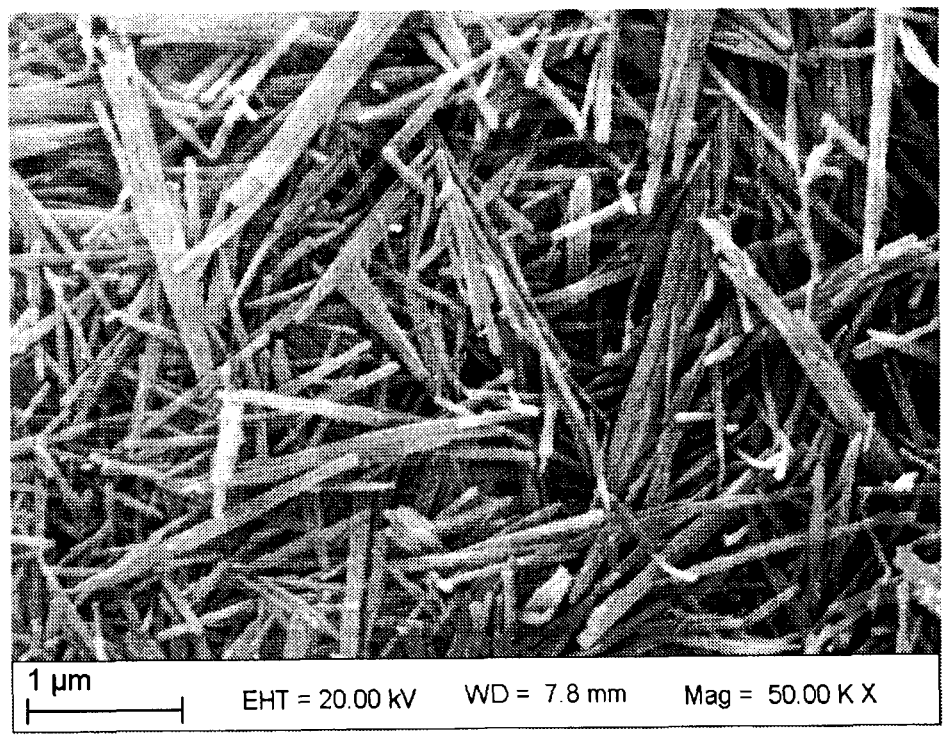
Figure 2. Scanning Electron Microscopy (SEM) image of sample obtained from Example 9.

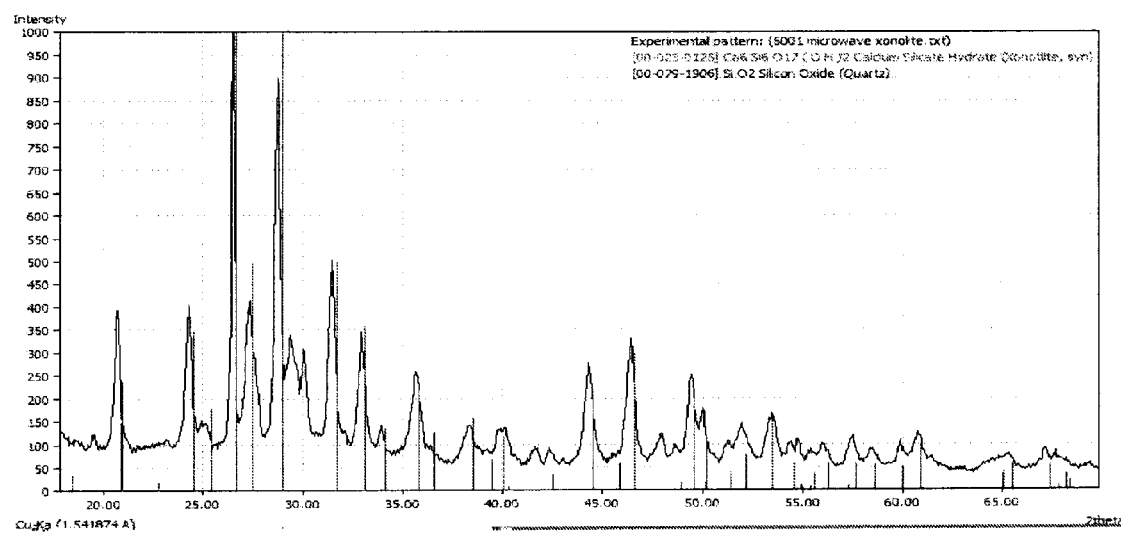
Figure 3. Ca(OH)$_2$:SiO$_2$ = 1:1, Water/Solid =0.94:1, T=225 °C, time =5 h

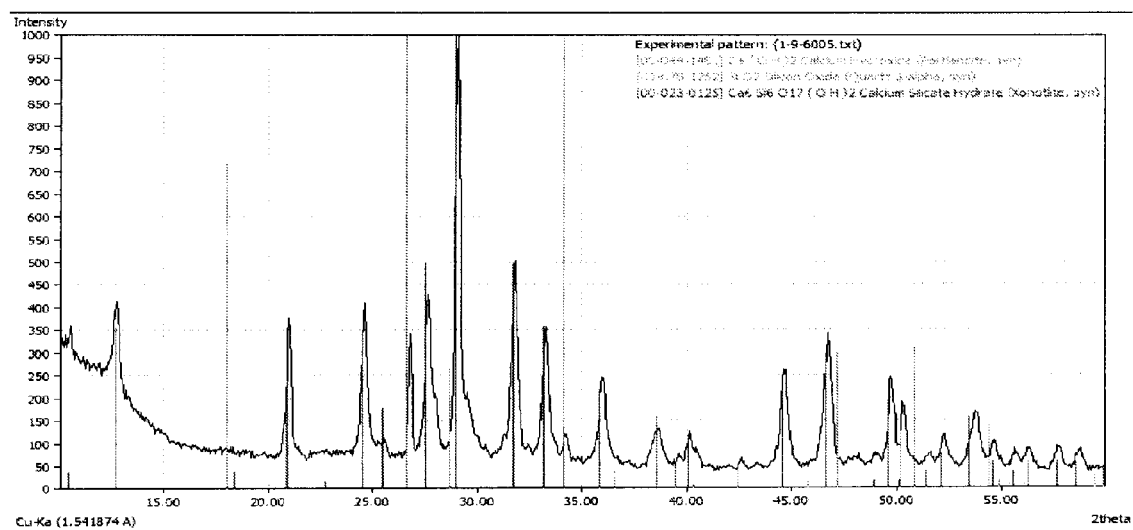
Figure 4. Ca(OH)$_2$:SiO$_2$ = 1:1, 0.05M CaCl$_2$, W/S=0.94, T= 225 °C, time =4 h

SYNTHETIC FORMULATIONS AND METHODS OF MANUFACTURING AND USING THEREOF

BACKGROUND OF THE INVENTION

1. Field of the Invention

The present invention relates to synthetic formulations that carbonate sufficiently so that they are particularly suitable for use in certain industrial and other applications.

2. Discussion of the Related Art

Portland Cement is the most common type of hydraulic cement in general use around the world due to the low cost and widespread availability of limestone, shales, clay and sand. Portland Cement, in turn, is one of the lowest-cost construction materials widely used over the last century throughout the world.

However, there is a need for a replacement binding material that is stronger, more chemically stable, cures in a shorter time frame, producing less carbon dioxide, greenhouse gases and mercury pollution, and requiring less energy, while maintaining the low cost and the widespread availability of raw materials worldwide.

SUMMARY OF THE INVENTION

Accordingly, the present invention is directed to synthetic formulations and methods of manufacturing and using thereof that substantially obviate one or more of the problems due to limitations and disadvantages of the related art.

An advantage of the present invention is to provide more suitable materials for use in industrial applications, such as replacement of cement/concrete.

Another advantage of the present invention is to provide a process for producing such materials that minimize the production of greenhouse gases and other pollutants such as mercury.

Another advantage of the present invention is to provide a process for producing such materials that provide for higher strength materials.

Another advantage of the present invention is to provide a process for producing such materials that may be synthesized using widely available raw materials.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, there is a method for producing a reaction product including at least one synthetic formulation that carbonates, said method comprising: providing a first raw material, having a first concentration of M; providing a second raw material, having a second concentration of Me; and mixing the first raw material and the second raw material to produce a reaction product that includes at least one synthetic formulation having the general formula $M_aMe_bO_c$, $M_aMe_b(OH)_d$, $M_aMe_bO_c(OH)_d$ or $M_aMe_bO_c(OH)_d(H_2O)_e$, wherein M comprises at least one metal that can react to form a carbonate and Me is at least one element that can form an oxide during the carbonation reaction, wherein the ratio of a:b is between 0.167:1 to 2.5:1, wherein c is 3 or greater, wherein d is 1 or greater, wherein e is 0 or greater, wherein the at least one synthetic formulation is capable of undergoing a carbonation reaction, and wherein the at least one synthetic formulation is capable of undergoing volume change during the carbonation reaction.

In another aspect of the present invention, there is a method of manufacturing a composite material using a reaction product produced from a reaction between a first raw material, having a first concentration of M and a second raw material having a second concentration of Me, said method of manufacturing a composite material comprising: introducing a liquid solvent into pores of a solid body that includes the reaction product, wherein the reaction product includes at least one synthetic formulation having the general formula $M_aMe_bO_c$, $M_aMe_b(OH)$, $M_aMe_bO_c(OH)_d$ or $M_aMe_bI_c(OH)_d(H_2O)_e$ wherein M comprises at least one metal that can react to form a carbonate and Me is at least one element that can form an oxide during the carbonation reaction, wherein the ratio of a:b is between 0.167:1 and 2.5:1, wherein c is 3 or greater, wherein d is 1 or greater, wherein e is 0 or greater, wherein the at least one synthetic formulation is capable of undergoing a carbonation reaction, and wherein the at least one synthetic formulation is capable of undergoing volume change during the carbonation reaction; and introducing a gaseous reactant into the pores of the solid body, whereby particles of the at least one synthetic formulation are transformed into bonding elements that comprise: a core having a first chemical composition that includes one or more chemical elements; a first layer at least partially covering a peripheral portion of the core, the first layer having a second chemical composition different than the first chemical composition, the second chemical composition including cations corresponding to one of the chemical elements of the first chemical composition; and a second layer at least partially covering a peripheral portion of the first layer, the second layer having a third chemical composition different than the first and second chemical compositions, the third chemical composition including cations corresponding to one of the chemical elements of the first chemical composition.

It is to be understood that both the foregoing general description and the following detailed description are exemplary and explanatory and are intended to provide further explanation of the invention as claimed.

DESCRIPTION OF THE DRAWINGS

The accompanying drawings, which are included to provide a further understanding of the invention and are incorporated in and constitute part of this specification, illustrate embodiments of the invention and together with the description serve to explain the principles of the invention. In the drawings:

FIG. 1 is an X-ray diffraction (XRD) phase analysis of a reaction product from Example 9;

FIG. 2 is a Scanning Electron Microscopy (SEM) image of a sample obtained from Example 9;

FIG. 3 is an X-ray diffraction (XRD) phase analysis of a reaction product from Example 10; and FIG. 4 is an X-ray diffraction (XRD) phase analysis of a reaction product from Example 11.

DETAILED DESCRIPTION OF THE EMBODIMENTS

Reference will now be made in detail to embodiments of the present invention.

In accordance with exemplary embodiments of the present invention, a first raw material having a first concentration of M is mixed and reacted with a second raw material having a second concentration of Me to form a reaction product that includes at least one synthetic formulation having the general formula $M_aMe_bO_c$, $M_aMe_b(OH)_d$, $M_aMe_bO_c(OH)_d$ or $M_aMe_bO_c(OH)_d \cdot (H_2O)_e$, wherein M is at least one metal that can react to form a carbonate and Me is at least one element that can form an oxide during the carbonation reaction.

As stated, the M in the first raw material may include any metal that can carbonate when present in the synthetic formulation having the general formula $M_aMe_bO_c$, $M_aMe_b(OH)_d$, $M_aMe_bO_c(OH)_d$ or $M_aMe_bO_c(OH)_d \cdot (H_2O)_e$. For example, the M may be any alkaline earth element, preferably calcium and/or magnesium. The first raw material may be any mineral and/or byproduct having a first concentration of M. For example, the first raw material may include any one or more of the minerals listed in Table 1A. The first raw material may alternatively or further include any one or more of the byproducts listed in Table 1B.

TABLE 1A

Carbonates
Aragonite
Calcite
Dolomite
Magnesite
Gypsum
Marls
Talcs
Chlorites
Sulfates
Limestones
Calcium-Rich Biomass

TABLE 1B

Slags
Recycled Cement
Lime Kiln Dust (LKD)
Cement Kiln Dust (CKD)
Precipitated Calcium Carbonate
Recycled Paper
Flue Gas Desulfurization (FGD) Calcium Sulfate
Phosphorgypsum
Silicon-Rich Biomass As stated, the Me in the second raw material may include any element that can form an oxide by a hydrothermal disproportionation reaction when present in the synthetic formulation having the general formula $M_aMe_bO_c$, $M_aMe_b(OH)_d$, $M_aMe_bO_c(OH)_d$ or $M_aMe_bO_c(OH)_d \cdot (H_2O)_e$. For example, the Me may be silicon, titanium, aluminum, phosphorous, vanadium, tungsten, molybdenum, gallium, manganese, zirconium, germanium, copper, niobium, cobalt, lead, iron, indium, arsenic, sulfur and/or tantalum. In a preferred embodiment, the Me includes silicon. The second raw material may be any one or more minerals and/or byproducts having a second concentration of Me. For example, the second raw material may include any one or more of the minerals listed in Table 1C. The second raw material may include any one or more of the byproducts listed in Table 1D.

TABLE 1C

Silicates
Zeolites
Shales
Slates

TABLE 1C-continued

Clays
Argillites
Sandstones
Conglomerates
Basalts
Feldspars
Micas
Granites
Granodiorites
Diorites
Cherts
Sands
Amorphous Silicates

TABLE 1D

Flyash
Incinerator Dust
Fiberglass Cullet
Post and Pre-Consumer Glass
Mine Tailings
Rice Husk
Red Mud
Fresh and Salt Water Treatment Waste In accordance with the exemplary embodiments of the present invention, the first and second concentrations of the first and second raw materials are high enough that the first and second raw materials may be mixed in predetermined ratios to form a desired synthetic formulation having the general formula $M_aMe_bO_c$, $M_aMe_b(OH)_d$, $M_aMe_bO_c(OH)_d$ or $M_aMe_bO_c(OH)_d \cdot (H_2O)_e$, wherein the resulting synthetic formulation can undergo a carbonation reaction. In one or more exemplary embodiments, synthetic formulations having a ratio of a:b between approximately 2.5:1 to approximately 0.167:1 undergo a carbonation reaction. The synthetic formulations can also have an O concentration of c, where c is 3 or greater. In other embodiments, the synthetic formulations may have an OH concentration of d, where d is 1 or greater. In further embodiments, the synthetic formulations may also have a $H_2O$ concentration of e, where e is 0 or greater. Some exemplary, but non-limiting, examples of these embodiments of the synthetic formulations are shown in Tables 2A and 2B.

In accordance with the exemplary embodiments of the present invention, the synthetic formulation may be further reacted in a carbonation process. For example, particles of the synthetic formulation may be exposed to a reactive liquid, where a reactant associated with the liquid reacts with the M to form a carbonate phase and the Me to form an oxide phase by hydrothermal disproportionation. A more complete description of the possible carbonation processes is presented in U.S. provisional application No. 61/449,659, now U.S. patent application Ser. No. 13/411,218, which is incorporated by reference in its entirety for all purposes as if fully set forth herein.

In preferred embodiments, a volume expansion of the synthetic formulation occurs during the carbonation process. Tables 2A and 2B list calculated volume change values for exemplary synthetic formulations.

In Tables 2A and 2B, the last column (V %) shows the calculated volume change when the exemplary synthetic formulations are carbonated (e.g. reacted with $CO_2$). It is believed that large volume expansion upon carbonation creates good bonding to solidify the reaction product that includes the synthetic formulation.

TABLE 2A

| Calcium Silicate Hydrates | | | |
|---|---|---|---|
| Name | Formula | M/M$_e$ | V % |
| (a). Wollastonite group | | | |
| Foshagite | $Ca_4(Si_3O_9)(OH)_2$ | 1.33 | 52.12% |
| Hillebrandite | $Ca_2(SiO_3)(OH)_2$ | 2 | 45.98% |
| Nekoite | $Ca_3Si_6O_{15} \cdot 7H_2O$ | 0.5 | −3.58% |
| Okenite | $Ca_3Si_6O_{15} \cdot 6H_2O$ | 0.5 | 2.95% |
| Pectolite | $Ca_2NaHSi_3O_9$ | 1 | 14.57% |
| Xonotlite | $Ca_6Si_6O_{17}(OH)_2$ | 1 | 49.39% |
| (b). Tobermorite group | | | |
| Clinotobermorite c | $Ca_5Si_6O_{17} \cdot 5H_2O$ | 0.83 | 28.36% |
| Clinotobermorite d | $Ca_5Si_6O_{17} \cdot 5H_2O$ | 0.83 | 28.36% |
| 'Clinotobermorite 9 Å' c | $Ca_5Si_6O_{16}(OH)_2$ | 0.83 | 56.20% |
| 'Clinotobermorite 9 Å' d | $Ca_5Si_6O_{16}(OH)_2$ | 0.83 | 56.25% |
| Oyelite | $Ca_{10}B_2Si_8O_{29} \cdot 12.5H_2O$ | 1.25 | 19.66% |
| 9 Å tobermorite (riversideite) c | $Ca_5Si_6O_{16}(OH)_2$ | 0.83 | 56.25% |
| 9 Å tobermorite (riversideite) d | $Ca_5Si_6O_{16}(OH)_2$ | 0.83 | 56.04% |
| Anomalous 11 Å tobermorite c | $Ca_4Si_6O_{15}(OH)_2 \cdot 5H_2O$ | 0.67 | 13.91% |
| Anomalous 11 Å tobermorite d | $Ca_4Si_6O_{15}(OH)_2 \cdot 5H_2O$ | 0.67 | 13.91% |
| Normal 11 Å tobermorite d | $Ca_{4.5}Si_6O_{16}(OH) \cdot 5H_2O$ | 0.75 | 17.55% |
| 14 Å tobermorite (plombierite) c | $Ca_5Si_6O_{16}(OH)_2 \cdot 7H_2O$ | 0.83 | 4.28% |
| 14 Å tobermorite (plombierite) d | $Ca_5Si_6O_{16}(OH)_2 \cdot 7H_2O$ | 0.83 | 1.99% |
| (c). Jennite group | | | |
| Jennite | $Ca_9Si_6O_{18}(OH)_6 \cdot 8H_2O$ | 1.5 | 10.72% |
| Metajennite | $Ca_9Si_6O_{18}(OH)_6 \cdot 8H_2O$ | 1.5 | 19.67% |
| (d). Gyrolite Group | | | |
| Fedorite | $(Na,K)_2(Ca,Na)_7(Si,Al)_{16}O_{38}(F,OH)_2 \cdot 3.5H_2O$ | 0.56 | 7.30% |
| Gyrolite | $NaCa_{16}Si_{23}AlO_{60}(OH)_8 \cdot 14H_2O$ | 0.67 | 13.30% |
| K-phase | $Ca_7Si_{16}O_{38}(OH)_2$ | 0.44 | 26.57% |
| Reyerite | $Na_2Ca_{14}Si_{22}Al_2O_{58}(OH)_8 \cdot 6H_2O$ | 0.67 | 18.44% |
| Truscottite | $Ca_{14}Si_{24}O_{58}(OH)_8 \cdot 2H_2O$ | 0.58 | 30.76% |
| Z-phase | $Ca_9Si_{16}O_{40}(OH)_2 \cdot 14H_2O$ | 0.56 | 7.06% |
| (e). γ-C2S group | | | |
| Calcium chondrodite g | $Ca_5[SiO_4]_2(OH)_2$ | 2.5 | 63.78% |
| Kilchoanite | $Ca_6(SiO_4)(Si_3O_{10})$ | 1.5 | 75.76% |
| (f). Other Calcium silicate phases | | | |
| Afwillite | $Ca_3(SiO_3OH)_2 \cdot 2H_2O$ | 1.5 | 30.42% |
| α-C$_2$SH | $Ca_2(HSiO_4)(OH)$ | 2 | 47.12% |
| Cuspidine h | $Ca_4(F_{1.5}(OH)_{0.5})Si_2O_7$ | 2 | 67.86% |
| Dellaite | $Ca_6(Si_2O_7)(SiO_4)(OH)_2$ | 2 | 71.17% |
| Jaffeite | $Ca_6[Si_2O_7](OH)_6$ | 3 | 41.96% |
| Killalaite | $Ca_{6.4}(H_{0.6}Si_2O_7)_2(OH)_2$ | 1.6 | 65.11% |
| Poldervaartite i | $Ca(Ca_{0.67}Mn_{0.33})(HSiO_4)(OH)$ | 2 | 26.10% |
| Rosenhahnite | $Ca_3Si_3O_8(OH)_2$ | 1 | 56.35% |
| Suolunite | $CaSiO_{2.5}(OH) \cdot _{0.5}H_2O$ | 1 | 33.02% |
| Tilleyite | $Ca_5Si_2O_7(CO_3)_2$ | 2.5 | 42.40% |
| (g). Other high temperature cement phases | | | |
| Bicchulite | $Ca_2(Al_2SiO_6)(OH)_2$ | 0.67 | 54.71% |
| Fukalite | $Ca_4(Si_2O_6)(CO_3)(OH)_2$ | 2 | 41.40% |
| Katoite Hydrogarnet 1 | $Ca_{1.46}AlSi_{0.55}O_6H_{3.78}$ | 0.30 | 71.13% |
| Rustumite | $Ca_{10}(Si_2O_7)_2(SiO_4)Cl_2(OH)_2$ | 2 | 60.83% |
| Scawtitem | $Ca_7(Si_6O_{18})(CO_3) \cdot 2H_2O$ | 1.17 | 43.03% |
| Stratlingite | $Ca_2Al_2(SiO_2)(OH)_{10} \cdot 2.25H_2O$ | 0.62 | −32.08% |

TABLE 2B

Calcium Silicates

| Name | Formula | Ca/Si | V % |
|------|---------|-------|-----|
| (a). Nesosilicate Subclass (single tetrahedrons) | | | |
| Forsterite | $Mg_2(SiO_4)$ | 2 | 99.85% |
| Andradite | $Ca_3Fe^{3+}{}_2(SiO_4)_3$ | 0.6 | 51.80% |
| Grossular | $Ca_3Al_2(SiO_4)_3$ | 0.6 | 56.76% |
| Pyrope | $Mg_3Al_2(SiO_4)_3$ | 0.6 | 60.05% |
| Olivine | $(Mg,Fe^{2+})_2(SiO_4)$ | 2 | 86.25% |
| Sphene/Titanite | $CaTiSiO_5$ | 1 | 16.02% |
| Larnite | $Ca_2SiO_4$ | 2 | 80.36% |
| Hatrurite (alite) | $Ca_3SiO_5$ | 3 | 84.91% |
| (b). Sorosilicate Sublcass (double tetrahedrons) | | | |
| Danburite | $CaB_2(SiO_4)_2$ | 0.5 | 15.45% |
| (c). Inosilicate Subclass (single and double chains) | | | |
| Augite | $(Ca,Na)(Mg,Fe,Al,Ti)(Si,Al)_2O_6$ | ~0.5 | 36.56% |
| Diopside | $CaMg(Si_2O_6)$ | 1 | 49.05% |
| Enstatite | $Mg_2Si_2O_6$ | 1 | 83.30% |
| Hedenbergite | $CaFe^{2+}Si_2O_6$ | 0.33 | 35.84% |
| Hypersthene | $MgFe^{2+}Si_2O_6$ | 1 | 32.18% |
| Rhodonite | $(Mn^{2+},Fe^{2+},Mg,Ca)SiO_3$ | 1 | 83.81% |
| Wollastonite 1A | $CaSiO_3$ | 1 | 65.51% |
| (d). Cyclosilicate Subclass (rings) | | | |
| Cordierite | $(Mg,Fe)_2Al_4Si_5O_{18}$ | ~0.22 | −8.48% |
| Osumilite-(Mg) | $(K,Na)(Mg,Fe^{2+})_2(Al,Fe^{3+})_3(Si,Al)_{12}O_{30}$ | ~0.167 | 4.69% |
| Osumilite-(Fe) | $(K,Na)(Mg,Fe^{2+})_2(Al,Fe^{3+})_3(Si,Al)_{12}O_{30}$ | ~0.167 | 1.92% |
| Pseudo-Wollastonite | $Ca_3Si_3O_9$ | 1 | 65.73% |
| (e). Tectosilicate Subclass (frameworks) | | | |
| Andesine | $(Na,Ca)(Si,Al)_4O_8$ | ~0.25 | 52.01% |
| Anorthite | $CaAl_2Si_2O_8$ | 0.25 | −6.58% |
| Bytownite | $(Na,Ca)(Si,Al)_4O_8$ | ~0.25 | 50.70% |
| Labradorite | $(Na,Ca)(Si,Al)_4O_8$ | ~0.25 | 51.35% |
| Oligoclase | $(Na,Ca)(Si,Al)_4O_8$ | ~0.25 | 52.69% |

In an example, the M in the first raw material includes a substantial concentration of calcium and the Me in the second raw material contains a substantial concentration of silicon. Thus, for example, the first raw material may be or include limestone, which has a first concentration of calcium. The second raw material may be or include shale, which has a second concentration of silicon. The first and second raw materials are then mixed and reacted at a predetermined ratio to form reaction product that includes at least one synthetic formulation having the general formula $(Ca_wM_x)_a(Si_y,Me_z)_bO_c$, $(Ca_wM_x)_a(Si_y,Me_z)_b(OH)_d$, $(Ca_wM_x)_a(Si_y,Me_z)_bO_c(OH)_d$, or $(Ca_wM_x)_a(Si_y,Me_z)_bO_c(OH)_d\cdot(H_2O)_e$, wherein M may include one or more additional metals other than calcium that can react to form a carbonate and Me may include one or more elements other than silicon that can form an oxide during the carbonation reaction. The limestone and shale in this example may be mixed in a ratio a:b such that the resulting synthetic formulation can undergo a carbonation reaction as explained above. As shown in Table 2A, the resulting synthetic formulation may be, for example, wollastonite, $CaSiO_3$, having a 1:1 ratio of a:b. However, for synthetic formulation where M is mostly calcium and Me is mostly silicon, it is believed that a ratio of a:b between approximately 2.5:1 to approximately 0.167:1 may undergo a carbonation reaction because outside of this range there may not be a reduction in greenhouse gas emissions and the energy consumption or sufficient carbonation may not occur. For example, for a:b ratios greater than 2.5:1, the mixture would be M-rich, requiring more energy and release of more $CO_2$. Meanwhile for a:b ratios less than 0.167:1, the mixture would be Me-rich and sufficient carbonation may not occur.

In another example, the M in the first raw material includes a substantial concentration of calcium and magnesium. Thus, for example, the first raw material may be or include dolomite, which has a first concentration of calcium, and the synthetic formulation have the general formula $(Mg_uCa_vM_w)_a(Si_y,Me_z)_bO_c$ or $(Mg_uCa_vM_w)_a(Si_y,Me_z)_b(OH)_d$, wherein M may include one or more additional metals other than calcium and magnesium that can react to form a carbonate and Me may include one or more elements other than silicon that can form an oxide during the carbonation reaction. In another example, the Me in the first raw material includes a substantial concentration of silicon and aluminum and the synthetic formulations have the general formula $(Ca_vM_w)_a(Al_xSi_y,Me_z)_bO_c$ or $(Ca_vM_w)_a(Al_xSi_y,Me_z)_b(OH)_d$, $(Ca_vM_w)_a(Al_xSi_y,Me_z)_bO_c(OH)_d$, or $(Ca_vM_w)_a(Al_xSi_y,Me_z)_bO_c(OH)_d\cdot(H_2O)_e$.

As compared with Portland Cement, which has an a:b ratio of approximately 2.5:1, the exemplary synthetic formulations of the present invention result in reduced amounts of $CO_2$ generation and require less energy to form the synthetic formulation, which is discussed in more detail below. The reduction in the amounts of $CO_2$ generation and the requirement for less energy is achieved for several reasons. First, less raw materials, such as limestone for example, is used as compared to a similar amount of Portland Cement so there is less $CaCO_3$ to be converted. Also, because fewer raw materials are used there is a reduction in the heat (i.e. energy) necessary for breaking down the raw materials to undergo the carbonation reaction. Also, as compared with Portland Cement, which undergoes a hydration reaction to fill in the pores of a porous body, the exemplary synthetic formulations of the present invention undergo a carbonation reaction to fill in the pores of a porous body, although some hydration may also occur.

Additional examples and features will be explained with reference to the following sections.

In one exemplary embodiment, the reaction product that includes the at least one synthetic formulation may be incorporated into concrete, ceramic or composite materials by carbonating the synthetic formulation, thereby forming a binder or cement phase or ceramic bonding phase or combinations thereof. Carbonation of synthetic formulations is preferred over hydration, where hydration is the curing reaction involved in Portland Cement, because carbonation produces cementitious materials that are stronger and more chemically stable than Portland Cement, and react in a shorter time frame relative to hydration curing. Also, carbonation processes may utilize starting raw materials that contain a low concentration of calcium more effectively than hydration processes. For example, a hydration reaction involving wollastonite (a:b=1:1) forms little or no hydration phases while a carbonation reaction involving wollastonite produces an extensive amount of carbonate phase(s). It is also believed that calcium aluminate phase(s) may be included in some Wollastonite-like synthetic formulations and that the calcium aluminate phase(s) may very well hydrate instead of carbonate. Thus, hydration may also occur during the carbonation of the synthetic formulations, but preferably the synthetic formulations are primarily carbonated.

As previously mentioned, carbonation results in a number of advantageous properties. For example, a hydrated product has little or no mechanical strength while a carbonated product has superior mechanical properties that exceed what can be achieved with Portland Cement. Such properties may be achieved even when the synthetic formulation is deficient in M relative to Portland Cement. Portland Cement relies on calcium-rich phases with 3:1 and 2:1 a:b ratios, such as Alite ($Ca_3SiO_5$) or Belite ($Ca_2SiO_4$), to achieve extensive hydration and attractive mechanical properties. However, even with these calcium-rich phases, the properties of Portland Cement in concretes utilizing hydraulic bonds are inferior to the strength and other associated properties of concretes made by carbonation of the synthetic formulations of the present invention.

Wollastonite synthetic formulations or Wollastonite-like synthetic formulations (species containing calcium silicate, such as hydrates, aluminates, etc) may be synthesized, where the M content is less than Portland Cement. Typical Portland Cement has around 66 wt % CaO, and wollastonite has 48 wt % CaO.

As mentioned previously, exemplary synthetic formulations of the present invention result in reduced amounts of $CO_2$ emissions and require less energy relative to Portland Cement. To explain further, the $CO_2$ emissions due to decomposition of $CaCO_3$ required per ton of Portland Cement is approximately 518 kg and $CO_2$ release due to fuel required for calcination of $CaCO_3$ or limestone during the manufacturing of one ton of Portland Cement is approximately 280 kg. Thus, the total $CO_2$ release during calcination of Portland Cement is approximately 798 kg. In comparison, if the same raw materials are used to produce Wollastonite-like synthetic formulations of the present invention, the total $CO_2$ emissions per ton during calcination is approximately 580 kg. The $CO_2$ savings are approximately 27%. The estimated energy savings are approximately 26%.

Additional energy required to produce Portland Cement after the calcination step is approximately 1.92 gigajoules and this corresponds to 168 kg of $CO_2$ emissions. For the Wollastonite-like synthetic formulations, this energy is estimated as approximately 1.45 gigajoules which is equivalent to 127 kg of $CO_2$ emission. When the whole processes are compared, the $CO_2$ release per ton of Portland Cement is approximately 967 kg and approximately 708 kg for the Wollastonite-like synthetic formulations. This is equivalent to a decrease of approximately 26% in $CO_2$ emissions. The energy savings are comparable to the $CO_2$ savings. One ton of Portland Cement requires approximately 5.1 gigajoules of energy whereas 1 ton of Wollastonite-like synthetic formulations will require approximately 3.76 gigajoules which is equivalent to approximately 26% energy savings. It is believes that other synthetic formulations of the present invention also result in similar $CO_2$ and energy savings.

The use of a:b ratios lower than 2.5:1, also referred to in this specification as a M-deficient mixtures, serves to reduce the endothermic energy demand for reaction of raw materials such as limestone with silica since calcium carbonate decomposition always precedes the formation of the calcium silicate phases. Thus, the exothermal heat released by calcium silicate formation does not off-set this energy demand. Since this is the case, synthetic formulations having M-deficient mixtures require substantially less energy to process and also release less $CO_2$ (from energy consumption (electrical and fuel-based) and limestone decomposition) into the atmosphere. This will make a process for manufacturing synthetic formulations a relatively greener process, meaning a process that significantly reduces the energy demand per ton of product produced and releases less carbon dioxide per ton of product.

The energy and $CO_2$ savings may be further improved significantly by using M containing byproducts such as fly ash, Basic Oxygen Furnace (BOF) slag, etc., as raw materials.

Synthetic formulations may be used that can serve as reactants to foster calcium and magnesium carbonation reactions and resultantly when used as a low temperature solidification (LTS) process facilitates carbonation mechanisms for bonding. The synthetic formulations may include one or more phases that are crystalline and/or amorphous. The synthetic formulations may be single phase or multi-phase. The reaction product that includes the at least one synthetic formulation may also include other components that do not carbonate and are hereto referred to as inert components. Some of these inert components may hydrate but not carbonate.

The synthetic formulation may be formed from raw materials that are a sole byproduct or mixture of byproducts that is/are processed in a manner that activates it as an effective cement or binder. Exemplary byproducts include fly ash, incinerator ash, slag, lime kiln dust, and recycled cement. The synthetic formulations may also include abundant minerals such as shale, limestone ($CaCO_3$), quartz ($SiO_2$), sand, clay, magnesite ($MgCO_3$) and dolomite $(Mg,Ca)CO_3$, among many others. In addition, both byproducts and minerals may be combined together to make a synthetic formulation as well.

Accordingly, the synthetic formulations may be synthesized from minerals and/or byproducts that are abundant and easily accessible so that the process may be deployed worldwide.

The synthetic formulations may be synthesized through a variety of reaction pathways such as solid state-reaction, mechanochemical activation, hydrothermal reaction and combinations thereof, such as mechanochemical-hydrothermal or mechanochemical-solid state, hydrothermal-solid state, and mechanochemical-hydrothermal-solid state processes among others.

The reaction product that includes the at least one synthetic formulation may include a substantial portion thereof that is reactive with carbon dioxide to initiate the carbonation reaction for carbon capture and sequestration as well as product manufacturing. The reaction product that includes the at least one synthetic formulation may be incorporated into a porous matrix useful for a wide range of hydrothermal liquid phase sintering (HLPS) processes, also known as low temperature solidification (LTS).

From a composition of matter standpoint, carbonated products formed by carbonating the synthetic formulations may have microstructures including bonding elements, bonding matrix, connectivity, and hierarchy, as disclosed in U.S. provisional application No. 61/449,659, now U.S. patent application Ser. No. 13/411,218, which is incorporated by reference in its entirety for all purposes as if fully set forth herein, thereby yielding novel properties for carbonated products that may be used for a wide range of applications. Exemplary applications include structural, insulative, refractory, biomedical applications, among other possibilities.

Sythesis by Solid State Reaction

The energy required for the production of Portland Cement is largely determined by the large endothermic reaction for carbonate decomposition ($\Delta H$=2.7 Gigajoules per ton of $CaCO_3$). In Portland Cement production, compounds that are excess in calcium are required to form a hydration bond, where a:b ratios are greater than 2:1 and CaO content is typically at least 66%. Typically, Alite ($Ca_3SiO_5$) and Belite ($Ca_2SiO_4$) compounds are formed.

In contrast synthetic formulations such as wollastonite ($CaSiO_3$), wherein a:b: ratios are less than 2.5:1, and CaO content is typically approximately 48%, are very suitable for carbonation. Thus, it is now possible to use synthetic formulations that have a:b: ratios that are lower than 2.5:1 for use in the present invention. The ultimate range of a:b ratios in the synthetic formulations are bounded by equilibrium thermodynamics and kinetics and may be broader than the range specified here. For example, particle size and mixing homogeneity may be varied to obtain a wide range of synthetic formulations with varying a:b ratios that may be M-deficient.

In one example, mixtures of calcium hydroxide and quartz may be used as raw materials for synthesizing synthetic formulations of the present invention. In this case, the temperature for calcination is much lower. For example, calcium hydroxide is routinely known to decompose at 512° C., which is much lower than the decomposition temperature of 840° C. for calcium carbonate. Note that these decomposition temperatures are approximate since particle size is well known to control decomposition temperature via kinetic rather than thermodynamic mechanisms. In addition, the endothermic heat required for decomposition of calcium hydroxide is lower. Thus, lower calcination temperatures and reduced endothermicity both contribute to reduced energy demand. Furthermore, decomposition of metal hydroxides will not generate carbon dioxide. Although energy and $CO_2$ might be generated in the process of making a metal hydroxide, if the metal hydroxide is derived from a byproduct, then no additional energy is consumed and no $CO_2$ is generated in order to make a synthetic formulation containing this metal hydroxide byproduct.

Furthermore, hydroxylated calcium silicate may decompose to form oxide synthetic formulations that can be carbonated, such as wollastonite among others. Such a raw material may be xonotlite, $Ca_6Si_6O_{17}(OH)_2$, which has the same a:b ratio as wollastonite. Xonotlite can thermally decompose to form wollastonite when heated to approximately 800° C. for 1 hour. In addition, other hydroxylated calcium-silicate phases may be just as suitable, such as those summarized in Table 2A.

Another suitable raw material may be byproducts, such as those cited earlier, that already have calcium and silicon mixed intimately as various calcium silicate phases. Again, energy and $CO_2$ emissions are avoided by choosing this byproduct over those that are mixtures of minerals such as limestone and quartz, among other possible mixtures.

Synthetic formulations that have favorable a:b ratios have varying levels of reactivity to $CO_2$. For example, wollastonite reacts at substantially lower temperatures than diopside ($CaMgSi_2O_6$). Thus, it is believed that a raw material may be rendered more reactive to $CO_2$ by effecting a phase transformation before carbonation. Several phase transformations may be beneficial to this end, examples of which are described below.

In a first example, the raw material may be heated to an incongruent reaction temperature where the raw material decomposes into a synthetic formulation having two or more compounds where one or more of these compounds can be carbonated. For example, in the $CaO—SiO_2$ system, $Ca_3Si_2O_7$ may be heat treated to form liquid and $Ca_2SiO_4$. $Ca_3Si_2O_7$ melts incongruently to form a liquid and $Ca_2SiO_4$ at the peritectic temperature of approximately 1470° C.

In a second example, a raw material may include components that easily devitrify into synthetic formulations that sufficiently carbonate. For example, glasses that are lime-rich (e.g., having a calcium content of 12-14%) may include components that easily devitrify. More specifically, calcium aluminosilicates devitrify to form wollastonite, anorthite ($CaAl_2Si_2O_8$) and tridymite ($SiO_2$). Another example, blast furnace slag ($CaO:SiO_2:Al_2O_3$ in a ratio of approximately 3:3:1 by weight) can devitrify into wollastonite and anorthite. Alternatively, recycled glass may be mixed with CaO-rich materials such as lime kiln dust (LKD) to also make a calcium-rich glass. These components may powderized by quenching them rapidly in water or other quenching media, thereby saving energy and reducing $CO_2$ emissions by avoiding a milling step (reduced use of electricity). Devitrification may also be effected by treating glass in aqueous solutions or steam.

Other melt based methods such as those based on molten salts solvents may also be used to crystallize calcium silicates from minerals or byproducts.

Synthesis by Mechanochemical Methods

Mechanochemical methods, such as dry mechanochemical methods, may be used to synthesize the synthetic formulations for carbonation from mixtures containing raw materials such as slag and gypsum. In another example, synthetic formulations based on sulfates may be prepared via dry mechanochemical reaction using calcium hydroxide, calcium sulfate and aluminum hydroxide.

Mechanochemical methods typically involve the use of a high energy ball mill to heat and fracture the precursor materials while also bringing them into intimate contact with one another, thereby initiating a chemical reaction between the different precursor materials An advantage of using mechanochemical methods for making synthesized formulations is avoiding the energy associated with heating to high temperature. Instead, less energy is invested as mechanical energy. For example, roughly 1-6 GJ/ton of thermal energy is required to make a synthetic formulation via a solid state reaction method while mechanochemical processes may require approximately 0.2-0.5 GJ/ton. The mechanochemical processes require electricity, which can be assumed to have generated $CO_2$ at the typical power plant where 3.6 GJ translates into 1 ton of $CO_2$, assuming a 35% conversion efficiency for a coal plant.

Mechanochemical methods may be used for the preparation of multicomponent oxides such as calcium silicates in conjunction with hydrothermal reactions via a hybridized method. In this hybridized method, calcium hydroxide and silicate may be mechanochemically reacted and subsequently hydrothermally treated. In another hybridized method, a solution may be used in conjunction with mechanochemistry, such as in the mechanochemical-hydrothermal synthesis of hydroxyapatite.

Synthesis by Hydrothermal Methods

Hydrothermal methods can include processes performed in an autoclave in which all of the precursor materials are supplied along with hot water under autogeneous vapor pressure.

Many synthetic formulations that carbonate completely and rapidly will contain hydroxyl groups. In the calcium-silicon system, a large number of hydrated phases offer this capability. Table 2A summarizes a wide range of calcium-silicon hydroxide synthetic formulations that may be synthesized and carbonated via a low temperature solidification (LTS) process.

The hydrothermal reaction method is an excellent way to make reaction products that include synthetic formulations that have hydroxyl groups and small particle size without the need for solid-state or mechanochemical processes. For example, xonotlite, $Ca_6Si_6O_{17}(OH)_2$, may be synthesized by the hydrothermal reaction method at 220° C. for 24 hours using silica, calcium oxide and NaOH as the raw materials. Synthetic formulations also may be made via the hydrothermal reaction method from byproducts, such as a carbide slag where a hydrothermal reaction temperature of 220° C. for 20 hours may be used. Hydrothermal synthesis of a xonotlite synthetic formulation, for example, is possible at 200° C. with mixtures of raw materials, such as quartz and lime. It is believe that any byproducts containing free silica and lime may be converted to a xonotlite synthetic formulation since raw materials such as lime kiln dust containing CaO can be reacted with mixtures containing high concentrations of free silica.

Hydrated synthetic formulations may be prepared involving more complex phase mixtures. For example, CaO—$Al_2O_3$—$SiO_2$—$H_2O$ mixtures may be hydrothermally treated to form portlandite ($Ca(OH)_2$), jaffeite ($Ca_6(Si_2O_7)(OH)_6$), xonotlite, gyrolite, ($NaCa_{16}Si_{23}AlO_{60}(OH)_8 \cdot 64(H_2O)$), 11 Å-tobermorite ($Ca_5Si_6(O,OH)_{18} \cdot 5H_2O$), truscottite ($(Ca,Mn^{++})_{14}Si_{24}O_{58}(OH)_8 \cdot 2(H_2O)$), hydrogarnet ($Ca_3Al_2(SiO_4)_{3-x}(OH)_{4x}$), and calcium aluminum silicate hydrate (e.g., such as $CaAl_2Si_6O_{16} \cdot 5H_2O$). It is believed that these synthetic formulations may be carbonated in a single process step.

It is believed that byproducts may be reacted to hydrothermally convert to phase assemblages involving one or more hydrated phases. For example, lime kiln dust (LKD) may provide CaO and fly ash may provide the silica and alumina for the hydrothermal reaction. Basic Oxygen Furnace (BOF) slag is calcium-rich and more abundant than lime kiln dust (LKD) or cement kiln dust (CKD).

Synthesis by Microwave-Hydrothermal Methods

Hydrothermal reactions involve water as a catalyst at elevated temperatures. Microwaves are absorbed directly by water, and the use of microwaves yields a higher heating rate than that achieved by using conventional heating. Hence, when microwave irradiation is carried out along with the hydrothermal reaction, it usually accelerates the hydrothermal reaction rate to a significant extent.

Like hydrothermal methods, microwave-hydrothermal methods are also conducted in an autoclave. In a microwave-hydrothermal method, the precursor materials are heated by microwave heating rather than conventional heating. Microwave heating converts microwave energy in situ into heat that promotes the desired reactions. This is unlike the conventional heating where the solid or liquid is heated from outside the vessel through conduction.

For example, when the Basic Oxygen Furnace (BOF) slag is hydrothermally treated using conventional heating, a tobermorite synthetic formulation was synthesized as the major phase at 200° C. after a holding time of 48 hours. In contrast, in the microwave—hydrothermal reaction, a tobermorite synthetic formulation was synthesized within 3 hours at the same temperature. Moreover, the compressive strength of the Basic Oxygen Furnace (BOF) slag is enhanced compared to conventional heating. Hence, when a hydrothermal method is used to make materials hydrated or carbonated, the microwave-hydrothermal method may be utilized in parallel.

Synthesis by Hybrid Methods

The above sections show that synthetic formulations may be prepared using processes such as solid state and glass melting methods as well as methods such as mechanochemical and hydrothermal methods. Furthermore, any two or more of these approaches may be hybridized to constitute additional approaches. For example, a hydrothermal method may be used to make a hydrate that may be subsequently converted to a reactive oxide by solid state methods. Conversely, a solid state reaction product may be converted to a hydrate by a hydrothermal treatment. For any hydrothermal reaction, if the source of Ca is $CaCO_3$, it needs to be calcined prior to the hydrothermal treatment.

The chemical equilibrium of calcium silicate systems in conjunction with other oxides, such as alumina, sodium oxide, magnesium oxide and others provides a wide range of secondary phases that may suitable for carbonation, as there are approximately 300 known natural forming carbonates and even more that may be derived synthetically. Table 3 is a representative sampling of phases that may favor carbonate formation and be suitable for an LTS process.

TABLE 3

Representative phases favorable for LTS process.

| Nesosilicates | Sorosilicate | Cyclosilicates | Inosilicates | Phyllosilicates | Tectosilicates |
|---|---|---|---|---|---|
| Forsterite - $Mg_2SiO_4$, Fayalite - $Fe_2SiO_4$ Andradite - $Ca_3Fe_2(SiO_4)_3$ | Hemimorphite - $Zn_4(Si_2O_7)(OH)_2 \cdot H_2O$ Epidote - $Ca_2(Al,Fe)_3O(SiO_4)(Si_2O_7)(OH)$, | Benitoite - $BaTi(Si_3O_9)$ Cordierite - $(Mg,Fe)_2Al_3(Si_5AlO_{18})$, | Enstatite - $MgSiO_3$ Diopside - $CaMgSi_2O_6$ | Antigorite - $Mg_3Si_2O_5(OH)_4$ Talc - $Mg_3Si_4O_{10}(OH)_2$ | Anorthite - $CaAl_2Si_2O_8$ Stilbite - $NaCa_2Al_5Si_{13}O_{36} \cdot 17H_2O$ |

All of the synthetic formulations, whether activated by solid state reaction, hydrothermal methods, mechanochemical routes or other approaches, can readily carbonate during an LTS process. For applications where porosity should be minimized and mechanical strength maximized, the volume expansion upon carbonation, which results in porosity reduction, may be maximized. Table 2B summarizes a wide range of anhydrous oxide synthetic formulations and their volume expansion upon carbonation, wherein values ranging from 15-100% are found. Table 2A summarizes hydrate synthetic formulations that offer volume expansion upon carbonation that ranges from less than zero to 100%. Synthetic formulations that offer volume expansion upon carbonation similar to or greater than what is typically expected from wollastonite are preferred. However, lower volume expansions may be useful depending on the property requirements of the application.

The particle morphology of the synthetic formulations may control the particle packing density of green bodies to be carbonated. The particles may be, for example, spherical, acicular or flake particles. Generally, synthetic formulations having very small volume expansion upon carbonation are undesirable because significant porosity reduction and strength enhancement may not occur. For example, carbonation of hydrated lime kiln dust (HLKD) alone produces products that have strengths on the order of high strength concrete (approximately 50 MPa, 1-inch diameter cylinders) because the HLKD is mostly or fully hydrated before the start of carbonation, thus volume expansion resulting from carbonation is low. In contrast, synthetic formulations such as wollastonite that do not hydrate easily at ambient conditions may show volume increases of approximately 50% or greater. Resultantly, these high volume expansion synthetic formulations demonstrate strength values that exceed high strength concrete materials by a factor or 3 or more (approximately 170 MPa, 1-inch diameter cylinders).

Based on a linear regression model, the volume expansion upon carbonation of calcium silicate hydrate (CSH) synthetic formulations (assuming all the reactants are fully reacted) may be estimated according to the number of atoms in the synthetic formulation.

Volume Expansion=$(86-4*N_{Si}-7.8*N_O-12*N_{OH}-97*N_{H2O})$ %, wherein $N_{Si}$=the number of Si over Ca, and $N_O$=the number of O atom over Ca, $N_{OH}$=the number of OH over Ca, and $N_{H2O}$=the number of $H_2O$ over Ca. Note that this volume expansion value is calculated assuming there are no impurity atoms.

From this calculation, one finds that increasing the amount of Ca in the synthetic formulation renders increased volume expansion upon carbonation, and that bonded water has the largest decreasing effect on volume expansion upon carbonation.

Byproducts may be used as raw materials to make synthetic formulations, which may then be carbonated to form high strength products, by realizing large volume increases upon carbonation. For example, by reacting byproduct such as lime kiln dust with another raw material such as recycled soda-lime-silica glass, the free calcium from the lime kiln dust may be used to devitrify the glass and form anhydrous calcium silicate phases such as wollastonite, which are more effective as a binder than carbonating hydrated lime in lime kiln dust. This is true because the volume expansion upon carbonation for wollastonite disproportionating into calcium carbonate and silica renders a large volume increase relative to the initial volume of wollastonite while hydrated lime shows a small volume change. Carbonating anhydrous lime is possible for effecting large volume expansion but then all contact with water must be avoided prior to carbonation, which is not practical for a large range of ceramic forming operations. It should also be noted that the required amount of volume change for a synthetic formulation in a porous body undergoing low temperature solidification (LTS) to make a carbonated product with attractive properties varies considerably by virtue of the important role of the characteristics of the initial porous matrix (also referred to as powder compact, green body, porous body, etc.). Characteristics such as percent porosity, pore size, pore size distribution, pore shape, tortuosity (type of interconnectivity) are some of the important considerations that may impact the required amount of volume change.

Also, a zero volume change or negative volume change upon carbonation may still make a product with attractive properties because the recrystallization may cause the crystals to grow in a way that establishes a reinforcing network.

In addition, characteristics of others components of the porous matrix may be considered as well. For example, if the porous matrix includes particles of other components, characteristics such as particle shape, particle size, particle size distribution, degree of agglomeration and others may be considered.

The synthetic formulation may be either a single phase or mixture of various phases that can carbonate to a significant extent, preferably greater than 30% volume expansion, and rapidly, preferably 10 days or less. Many variables may be controlled to determine how the carbonation proceeds, such as choice of the cations and characteristics of the porous matrix. By controlling these variables, the extent of carbonation may also be controlled to determine the volume expansion increase, thereby controlling whether a carbonated product with attractive properties can be engineered.

Synthetic formulations may be synthesized by combining a wide range raw materials that are available in large quantities, that can be found in numerous locations and that are low cost. The raw materials, including industrial chemicals, minerals and byproducts, may be combined an infinite number of ways as long as the mixture activates to form a synthetic formulations that can carbonate to a sufficient extent to form a product with attractive properties. Thus, monolithic products may be fabricated in virtually any part of the world on a large process scale in a cost effective manner.

Example 1

Table 4 lists four exemplary reaction products 1A-1D that include at least one synthetic formulation produced by solid state reactions. To form the synthetic formulations, the listed amount of calcium-rich raw material, if present, was mixed with the listed amount of silicon-rich raw material, placed in a muffle furnace for four hours at 1200° C. in an atmosphere of air and then analyzed to determine new phases formed in each reaction product.

Then, the reaction products 1A-1D were crushed by hand in a mortar and wet pressed at 2 tons pressure into ½ inch diameter pellets. The pellets were then carbonated in a carbon dioxide atmosphere of 20 psi pressure for 20 hours at 90° C. while being partially saturated with water and then analyzed to determine the phases present and the weight gain during carbonation.

In each example, the carbonation reaction resulted in the formation of calcium carbonate phases and a reduction of the amounts of calcium related and silicon related phases, and each example resulted in a measurable weight gain during carbonation. The greatest weight gain occurred for reaction products 1A and 1B, having synthetic formulations resulting from the mixture and reaction of a calcium-rich raw material with a silicon-rich raw material.

TABLE 4

| Ex. # | Ca-rich Raw Material | Amt. (g) | Si-rich Raw Material | Amt. (g) | Temp. (C.) | Time (hrs) | Phases Formed | Weight Gain During Carbonation |
|---|---|---|---|---|---|---|---|---|
| 1A | CaO | 30 g | Class C Fly Ash | 70 g | 1200 | 4 hrs | Ca-Silicates, Gehlenite, Bredigite, Akermanite | ~11% |
| 1B | CaO | 30 g | Class F Fly Ash | 70 g | 1200 | 4 hrs | Gehlenite, Ca-Silicates | 9.30% |
| 1C | n/a | n/a | Class C Fly Ash | 100 g | 1200 | 4 hrs | Gehlenite, Diopside | ~0.25% |
| 1D | n/a | n/a | Class F Fly Ash | 100 g | 1200 | 4 hrs | Wollastonite, Gehlenite | 3.49% |

Example 2

Table 5 lists two exemplary reaction products 2A-2B that include at least one synthetic formulation produced by solid state reactions. To form the synthetic formulations, the listed amount of calcium-rich raw material, if present, was mixed with the listed amount of silicon-rich raw material in a target ratio of 1 mol of calcium to 1 mol of silicon, placed in a muffle furnace for four hours at 1200° C. in an atmosphere of air and then analyzed to determine new phases formed in each reaction product.

Then, the reaction products 2A-2B were crushed by hand in a mortar and wet pressed at 2 tons pressure into ½ inch diameter pellets. The pellets were then carbonated in a carbon dioxide atmosphere of 20 psi pressure for 20 hours at 90° C. while being partially saturated with water and then analyzed to determine the phases present and the weight gain during carbonation.

In each example, the carbonation reaction resulted in the formation of calcium carbonate phases and a reduction of the amounts of calcium related and silicon related phases, and each example resulted in a measurable weight gain during carbonation.

TABLE 5

| Ex. # | Ca-rich Raw Material | Amt. (g) | Si-rich Raw Material | Amt. (g) | Temp. (C.) | Time (hrs) | Phases Formed | Weight Gain During Carbonation |
|---|---|---|---|---|---|---|---|---|
| 2A | $CaCO_3$ | 100 g | Fumed Silica | 60 g | 1200 | 4 hrs | Ca-Silicates and Residual Silica | 12.89% |
| 2B | CaO | 56 g | Fumed Silica | 60 g | 1200 | 4 hrs | Wollastonite | 16.73% |

Example 3

Table 6 lists four exemplary reaction products 3A-3D that include at least one synthetic formulation produced by solid state reactions. To form the synthetic formulations, the listed amount of calcium-rich raw material, if present, was mixed with the listed amount of silicon-rich raw material, placed in a muffle furnace for four hours at 1200° C. in an atmosphere of air and then analyzed to determine the phases present and the weight gain during carbonation.

Then, the reaction products 3A-3C were crushed by hand in a mortar with a pestle and wet pressed at 2 tons pressure into ½ inch diameter pellets. The pellets were then carbonated in a carbon dioxide atmosphere of 20 psi pressure for 20 hours at 90° C. while being partially saturated with water and then analyzed to determine the phases present and the weight gain during carbonation.

In each example, the carbonation reaction resulted in the formation of calcium carbonate phases and a reduction of the amounts of calcium related and silicon related phases, and each example resulted in a measurable weight gain during carbonation.

TABLE 6

| Ex. # | Ca-rich Raw Material | Amt. (g) | Si-rich Raw Material | Amt. (g) | Temp. (C.) | Time (hrs) | Phases Formed | Weight Gain During Carbonation |
|---|---|---|---|---|---|---|---|---|
| 3A | $CaCO_3$ | 30 g | Class C Fly Ash | 70 g | 1200 | 4 hrs | Gehlenite, Ca-Silicates | ~5.25% |
| 3B | $CaCO_3$ | 43 g | Class C Fly Ash | 57 g | 1200 | 4 hrs | Gehlenite, Ca-Silicates | ~7.5% |
| 3C | $CaCO_3$ | 30 g | Class F Fly Ash | 70 g | 1200 | 4 hrs | $Ca_2Al(AlSiO_7)$ Gehlenite + $Ca_2SiO_4$ and several other silicates | ~9.3% |
| 3D | $CaCO_3$ | 43 g | Class F Fly Ash | 57 g | 1200 | 4 hrs | Ca-silicates, Gehlenite, CaO | |

Example 4

Table 7 lists five exemplary reaction products 4A-4E that include at least one synthetic formulation produced by solid state reactions. To form the synthetic formulations, the listed amount of calcium-rich raw material, if present, was mixed with the listed amount of silicon-rich raw material, placed in a muffle furnace for four hours at 1200° C. in an atmosphere of air and then analyzed to determine the phases present and the weight gain during carbonation.

Then, reaction products 4A, 4B and 4D were crushed by hand in a mortar with a pestle and wet pressed at 2 tons pressure into ½ inch diameter pellets. The pellets were then carbonated in a carbon dioxide atmosphere of 20 psi pressure for 20 hours at 90° C. while being partially saturated with water and then analyzed to determine the phases present and the weight gain.

In each example, the carbonation reaction resulted in the formation of calcium carbonate phases and a reduction of the amounts of calcium related and silicon related phases, and each example resulted in a measurable weight gain during carbonation.

TABLE 7

| Ex. # | Ca-rich Raw Material | Amt. (g) | Si-rich Raw Material | Amt. (g) | Temp. (C.) | Time (hrs) | Phases Formed | Weight Gain During Carbonation |
|---|---|---|---|---|---|---|---|---|
| 4A | Hydrated Lime Kiln Dust | 20 g | Class C Fly Ash | 80 g | 1200 | 4 hrs | Gehlenite | 1.44% |
| 4B | Hydrated Lime Kiln Dust | 50 g | Class C Fly Ash | 50 g | 1200 | 4 hrs | Gehlenite, Ca-silicates | 11.32% |
| 4C | Hydrated Lime Kiln Dust | 80 g | Class C Fly Ash | 20 g | 1200 | 4 hrs | CaO, Ca-Silicate, NaCaSilicate | |
| 4D | Hydrated Lime Kiln Dust | 20 g | Class F Fly Ash | 80 g | 1200 | 4 hrs | CaO, Wollastonite | 12.37% |
| 4E | Hydrated Lime Kiln Dust | 50 g | Class F Fly Ash | 50 g | 1200 | 4 hrs | Gehlenite, Ca-Silicates | |

Example 5

Table 8 lists five exemplary reaction products 5A-5F that include at least one synthetic formulation produced by solid state reactions. To form the synthetic formulations, the listed amount of calcium-rich raw material, if present, was mixed with the listed amount of silicon-rich raw material, placed in a muffle furnace for two hours at 800° C. in an atmosphere of air and then analyzed to determine the phases present and the weight gain during carbonation.

In each example, carbonation is expected to result in the formation of calcium carbonate phases and a reduction of the amounts of calcium related and silicon related phases and to result in a measurable weight gain.

TABLE 8

| Ex. # | Ca-rich Raw Material | Amt. (g) | Si-rich Raw Material | Amt. (g) | Temp. (C.) | Time (hrs) | Phases Formed |
|---|---|---|---|---|---|---|---|
| 5A | Class C Fly Ash | 20 g | Recycled Glass | 80 g | 800 | 2 hrs | SiO2, Glass, Wollastonite Gehlenite |
| 5B | Class C Fly Ash | 30 g | Recycled Glass | 70 g | 800 | 2 hrs | SiO2, glass, Wollastonite, Gehlenite |
| 5C | CaCO3 | 20 g | Recycled Glass | 80 g | 800 | 2 hrs | SiO2, CaO, glass, woll. Na—Ca—Si—O |
| 5D | CaCO3 | 30 g | Recycled Glass | 70 g | 800 | 2 hrs | SiO2, CaO, Glass, Wollastonite Na—Ca—Si—O |
| 5E | Hydrated Lime Kiln Dust | 20 g | Recycled Glass | 80 g | 800 | 2 hrs | SiO2, CaO, Glass, ca-silicates |
| 5F | Hydrated Lime Kiln Dust | 20 g | Recycled Glass | 70 g | 800 | 2 hrs | SiO2, CaO, Glass, ca-silicates |

Example 6

Table 9 lists five exemplary reaction products 6A-6E that include at least one synthetic formulation produced by solid state reactions. To form the synthetic formulations, the listed amount of calcium-rich raw material, if present, was mixed with the listed amount of silicon-rich raw material, placed in a muffle furnace for two hours at 1100° C. in an atmosphere of air and then analyzed to determine the phases present and the weight gain during carbonation.

In each example, carbonation is expected to result in the formation of calcium carbonate phases and a reduction of the amounts of calcium related and silicon related phases and to result in a measurable weight gain.

TABLE 9

| Ex. # | Ca-rich Raw Material | Amt. (g) | Si-rich Raw Material | Amt. (g) | Temp. (C.) | Time (hrs) | Phases Formed |
|---|---|---|---|---|---|---|---|
| 6A | Class C Fly Ash | 20 g | Recycled Glass | 80 g | 1100 | 2 hrs | Glass, Wollastonite |
| 6B | $CaCO_3$ | 20 g | Recycled Glass | 80 g | 1100 | 2 hrs | Wollastonite, CaO, Glass |
| 6C | $CaCO_3$ | 30 g | Recycled Glass | 70 g | 1100 | 2 hrs | Wollastonite, CaO, Glass |
| 6D | Hydrated Lime Kiln Dust | 20 g | Recycled Glass | 80 g | 1100 | 2 hrs | CaO, Glass, Wollastonite |
| 6E | Hydrated Lime Kiln Dust | 30 g | Recycled Glass | 70 g | 1100 | 2 hrs | CaO, Glass, Wollastonite |

Example 7

Table 10 lists five exemplary reaction products 7A-7C that include at least one synthetic formulation produced by solid state reactions. To form the synthetic formulations, the listed amount of calcium-rich raw material, if present, was mixed with the listed amount of silicon-rich raw material, placed in a muffle furnace for two hours at 1000° C. in an atmosphere of air and then analyzed to determine the phases present and the weight gain during carbonation. Reaction products 7A, 7B and 7C have target a:b ratios of 1:1, 2:1 and 1:2, respectively.

In each example, carbonation is expected to result in the formation of calcium carbonate phases and a reduction of the amounts of calcium related and silicon related phases and to result in a measurable weight gain.

TABLE 10

| Ex. # | Ca-rich Raw Material | Amt. (g) | Si-rich Raw Material | Amt. (g) | Temp. (C.) | Time (hrs) | Phases Formed |
|---|---|---|---|---|---|---|---|
| 7A | $CaCO_3$ | 110 g | Shale (~70% $SiO_2$) | 100 g | 1000 | 2 hrs | Quartz + Lime >95% |
| 7B | $CaCO_3$ | 110 g | Shale (~70% $SiO_2$) | 50 g | 1000 | 2 hrs | Quartz + Lime >95% |
| 7C | $CaCO_3$ | 110 g | Shale (~70% $SiO_2$) | 200 g | 1000 | 2 hrs | Quartz + Lime >95% |

Example 8

Table 11 lists five exemplary reaction products 8A-8C that include at least one synthetic formulation produced by solid state reactions. To form the synthetic formulations, the listed amount of calcium-rich raw material, if present, was mixed with the listed amount of silicon-rich raw material, placed in a muffle furnace for two hours at 1100° C. in an atmosphere of air and then analyzed to determine the phases present and the weight gain during carbonation. Reaction products 8A, 8B and 8C have target a:b ratios of 1:1, 2:1 and 1:2, respectively.

In each example, carbonation is expected to result in the formation of calcium carbonate phases and a reduction of the amounts of calcium related and silicon related phases and to result in a measurable weight gain.

TABLE 11

| Ex. # | Ca-rich Raw Material | Amt. (g) | Si-rich Raw Material | Amt. (g) | Temp. (C.) | Time (hrs) | Phases Formed |
|---|---|---|---|---|---|---|---|
| 8A | $CaCO_3$ | 110 g | Shale (~70% $SiO_2$) | 100 g | 1100 | 2 hrs | Quartz + Lime >95% |
| 8B | $CaCO_3$ | 110 g | Shale (~70% $SiO_2$) | 50 g | 1100 | 2 hrs | Quartz + Lime >95% |
| 8C | $CaCO_3$ | 110 g | Shale (~70% $SiO_2$) | 200 g | 1100 | 2 hrs | Quartz + Lime >95% |

Example 9

Table 12 lists five exemplary reaction products 9A-9C that include at least one synthetic formulation produced by solid state reactions. To form the synthetic formulations, the listed amount of calcium-rich raw material, if present, was mixed with the listed amount of silicon-rich raw material, placed in a muffle furnace for two hours at 1200° C. in an atmosphere of air and then analyzed to determine the phases present and the weight gain during carbonation. Reaction products 9A, 9B and 9C have target a:b ratios of 1:1, 2:1 and 1:2, respectively.

In each example, carbonation is expected to result in the formation of calcium carbonate phases and a reduction of the amounts of calcium related and silicon related phases and to result in a measurable weight gain.

TABLE 12

| Ex. # | Ca-rich Raw Material | Amt. (g) | Si-rich Raw Material | Amt. (g) | Temp. (C.) | Time (hrs) | Phases Formed |
|---|---|---|---|---|---|---|---|
| 9A | $CaCO_3$ | 110 g | Shale (~70% $SiO_2$) | 100 g | 1200 | 2 hrs | Wollastonite, Gehlenite, Anorthite, Pigeonite, CaO |
| 9B | $CaCO_3$ | 110 g | Shale (~70% $SiO_2$) | 50g | 1200 | 2 hrs | CaO, Wollastonite, Gehlenite |
| 9C | $CaCO_3$ | 110 g | Shale (~70% $SiO_2$) | 200 g | 1200 | 2 hrs | SiO2, Wollastonite, Anorthite, Gehlenite |

Example 9

3.7 g of $Ca(OH)_2$ with average size of 5 μm and 3 g of quartz with average size of 25 μm were mixed together in 36 ml of 0.1M KOH aqueous solution under magnetic stirring at room temperature for 10 minutes, forming a milk-white suspension. The target ratio of a:b was kept at 1.0 and the target molar ratio of water/solid was kept at 20. Then the suspension was placed into a 120 ml polytetrafluoroethylene (PTFE) vessel and covered by a polytetrafluoroethylene (PTFE) lid. The covered vessel with the suspension was loaded into a TEFLON® PTFE rack and microwave-heated in a Milestones UltraClave microwave reactor to 225° C. at 30 bar of $N_2$ and maintained at this condition for 4 hours, and then cooled down to room temperature naturally. The resulting reaction product was dried at 75° C. in air for 12 hours.

The dried reaction product was characterized by powder X-ray diffraction (XRD) and Scanning Electron Microscopy (SEM). The XRD phase analysis showed the reaction product as including a synthetic formulation that was pure xonotlite phase (see FIG. 1). The SEM image showed that the synthetic formulation had a nanofiber shape with a diameter of 30-100 nm and a length of 1-4 μm (see FIG. 2).

Example 10

8.63 g of $Ca(OH)_2$ with average size of 5 μm and 7.0 g of quartz with average size of 25 μm were mixed together in 14.8 ml of deionized water under magnetic stirring at room temperature for 10 minutes, forming a milk-white suspension. The target ratio of a:b was kept at 1.0 and the target molar ratio of water/solid was kept at 3.53. Then the suspension was placed into a 120 ml of polytetrafluoroethylene (PTFE) vessel and covered by a polytetrafluoroethylene (PTFE) lid. The covered vessel with the suspension was loaded into a TEFLON® PTFE rack and microwave-heated in a Milestones UltraClave microwave reactor to 225° C. at 30 bar of $N_2$ and maintained at this condition for 5 hours, and then cooled down to room temperature naturally. The resulting reaction product was dried at 75° C. in air for 12 hours.

The dried reaction product was characterized by powder X-ray diffraction (XRD). The XRD phase analysis showed the reaction product as including an unreacted quartz phase and a xonotlite synthetic formulation (see FIG. 3).

Example 11

8.63 g of $Ca(OH)_2$ with average size of 5 μm and 7.0 g of Quartz with average size of 25 μm were mixed together in 15 ml 0.05M $CaCl_2$ under magnetic stirring at room temperature for 10 minutes, forming a milk-white suspension. The target ratio of a:b was kept at 1.0 and the target molar ratio of water/solid was kept at 3.57. Then the suspension was placed into a 120 ml polytetrafluoroethylene (PTFE) vessel and covered by a polytetrafluoroethylene (PTFE) lid. The covered vessel with the suspension was loaded into a TEFLON® PTFE rack and microwave-heated in a Milestones UltraClave microwave reactor to 225° C. at 30 bar of $N_2$ and maintained at this condition for 5 hours, and then cooled down to room temperature naturally. The resulting reaction product was dried at 75° C. in air for 12 hours.

The dried reaction product was characterized by powder X-ray diffraction (XRD). The XRD phase analysis showed the reaction product as including a small amount of unreacted quartz and a xonotlite synthetic formulation (see FIG. 4).

Example 12

A synthetic formulation of the type $M_aMe_bO_c$ where Me is predominantly Ca, Me is predominantly Si, and the a:b ratio is approximately 1:1.25, was prepared in the following manner. Limestone, clay and sand, of compositions listed in Table 13, were milled and blended in the following manner. Using a ball mill, the limestone was reduced to particles averaging about 14 microns in diameter, the clay was reduced to particles averaging about 12 microns in diameter and the sand was reduced to particles averaging about 4 microns in diameter. A dry mix consisting of 12 kg of milled limestone particles, 4.8 kg of milled clay particles, and 5.6 kg of milled sand particles was prepared. A wet mix was then prepared by adding water to the dry mix until a clay-like consistency was achieved. The wet mix was hand-rolled into individual granules approximately 6 mm in diameter.

TABLE 13

Compositions of limestone, clay and sand (in weight percentages)

|  | Limestone | Clay | Sand |
|---|---|---|---|
| % LOI | 43.01 | 5.93 | 0.21 |
| % $SiO_2$ | 1.91 | 63.20 | 96.28 |
| % $Al_2O_3$ | 0.30 | 14.64 | 1.88 |
| % TiO | 0.01 | 0.71 | 0.03 |
| % $Fe_2O_3$ | 0.41 | 5.77 | 0.09 |
| % $Mn_2O_3$ | 0.07 | 0.04 | 0.01 |
| % CaO | 52.51 | 1.17 | 0.08 |
| % MgO | 1.87 | 2.31 | 0.05 |
| % $P_2O_5$ | 0.03 | 0.11 | 0.01 |
| % $Na_2O$ | 0.01 | — | — |
| % $K_2O$ | 1.91 | — | — |
| % Cl | 0.30 | — | — |

The granules were fed into a pre-heated furnace and held at 1200° C. for 45 minutes. The granules were then removed from the furnace, cooled to ambient temperature and ball milled into −320 mesh powder form. The phase content of the powder was analyzed by X-ray diffraction (XRD). The results of the XRD are listed in Table 14.

TABLE 14

Phase content of −320 mesh powder, as measured by XRD

| Mineral Name | Composition | Fraction |
|---|---|---|
| Wollastonite | $CaSiO_3$ | 44.6 |
| Psuedowollastonite | $Ca_3Si_3O_9$ | 22.2 |
| Mellite | Complex Ca—Mg—Si—Al—O | 3.9 |
| Larnite | $Ca_2SiO_4$ | 8.3 |
| Gamma-$C_2S$ | $Ca_2SiO_4$ | 0.9 |
| Anorthite | $CaAl_2Si_2O_8$ | 6.7 |
| Quartz | $SiO_2$ | 5.1 |
| Lime | CaO | 6.1 |
| Hematite | $Fe_3O_2$ | 2.2 |

Example 13

Concrete samples, using the synthetic formulation described in Example 12 as the bonding element, were prepared in the following manner.

A dry-mix consisting of 16.67 kg of 0.375-inch aggregate, 16.67 kg of 0.75-inch aggregate, 30.6 kg of masonry sand, and 16.77 kg of synthetic formulation was prepared. A liquid solution consisting of 4.9 kg of deionized water, 55 g of Accumer and 8 gm of Whalen gum was also prepared. A wet-mix was then prepared by combining the dry-mix and the liquid solution in a standard cement mixer. The wet-mix was blended for 5 minutes in the cement mixer.

Samples for concrete testing were prepared by filling 4-inch diameter by 8-inch tall cylindrical steel molds with the wet-mix. The loaded molds were vibrated to achieve consistent material density throughout. Additional wet-mix was periodically added to assure that the molds were loaded to full capacity. The loaded molds were air-dried for 16 hours and oven-dried at 90° C. for 24 hours to create a porous, uncured concrete samples. The 4-inch diameter by 8-inch tall, uncured concrete samples were then removed from the mold and oven-dried at 90° C. for an additional 48 hours.

The uncured concrete samples were then reacted in an autoclave at 90° C. for 72 hours in a 20 psig atmosphere consisting of $CO_2$ and water vapor to achieve a hardened state. The hardened concrete samples were oven-dried at 90° C. for 48 hours.

The hardened concrete samples were tested for compressive strength according to ASTM C39, split tensile strength according to ASTM 469, and chloride permeability according to ASTM C1202. The compressive strength, split tensile strength and chloride permeability of the hardened concrete samples are listed and compared to values typical for Portland cement concrete in Table 15. In all cases, the hardened concrete samples of this example compare favorably to Portland cement concrete.

TABLE 15

Comparison of strength and permeability properties

| | Test Method | Portland cement concrete | Sample from Example 13 |
|---|---|---|---|
| Compressive Strength | ASTM C39 | ~3,000 to 6,000 psi | 10,020 psi |
| Split Tensile Strength | ASTM C469 | ~300 to 700 psi | 625 psi |
| Chloride Permeability | ASTM C1202 | ~3,000 Coulombs | 335 Coulombs |

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for producing a reaction product comprising:
providing a first raw material, having a first concentration of M;
providing a second raw material, having a second concentration of Me; and
mixing and heating the first raw material and the second raw material to produce a reaction product via a solid state reaction, the reaction product including at least one synthetic formulation having the general formula $M_aMe_bO_c$, $M_aMe_b(OH)_d$, $M_aMe_bO_c(OH)_d$ or $M_aMe_bO_c(OH)_d \cdot (H_2O)_e$, wherein M comprises at least one metal that forms a carbonate in a subsequent carbonation reaction and Me is at least one element that forms an oxide during the carbonation reaction, wherein the ratio of a:b is between 0.167:1 and 2.5:1, wherein c is 3 or greater, wherein d is 1 or greater, wherein e is 0 or greater, wherein the at least one synthetic formulation undergoes the carbonation reaction, and wherein the at least one synthetic formulation undergoes a volume change during the carbonation reaction.

2. The method of claim 1, wherein the at least one synthetic formulation undergoes volume expansion during the carbonation reaction.

3. The method of claim 1, wherein M comprises an alkaline earth element.

4. The method of claim 3, wherein the alkaline earth element is calcium.

5. The method of claim 3, wherein the alkaline earth element is magnesium.

6. The method of claim 1, wherein Me is selected from the group of elements consisting of silicon, titanium, aluminum, phosphorous, vanadium, tungsten, molybdenum, gallium, manganese, zirconium, germanium, copper, niobium, cobalt, lead, iron, indium, arsenic, sulfur, sodium, potassium, boron and tantalum.

7. The method of claim 1, wherein Me comprises Silicon.

8. The method of claim 1, wherein the first raw material is a calcium-rich mineral selected from the group of minerals consisting of Aragonite, Calcite, Dolomite, Gypsum, Marl, Chlorites, Sulfates and Limestone.

9. The method of claim 1, wherein the first raw material is a magnesium-rich mineral.

10. The method of claim 9, wherein the magnesium-rich mineral is Magnesite.

11. The method of claim 9, wherein the magnesium-rich mineral is Talc.

12. The method of claim 1, wherein the second raw material is a silicon-rich mineral selected from the group consisting of Silicate, Zeolite, Shale, Slate, Clay, Argillite, Sandstone, Conglomerate, Basalt, Feldspar, Mica, Granite, Granodiorite, Diorite, Chert, Sand and Amorphous Silicate.

13. The method of claim 1, wherein the first raw material is a calcium-rich byproduct selected from the group of byproducts consisting of slag, recycled cement, lime kiln dust (LKD), cement kiln dust (CKD), precipitated calcium carbonate, recycled paper, flue gas desulfurization (FGD) calcium sulfate, phosphorgypsum and silica-rich biomass.

14. The method of claim 1, wherein the second raw material is silicon-rich byproduct selected from the group of byproducts consisting of flyash, incinerator dust, fiberglass cullet, consumer glass, mine tailings, silica-rich biomass, rice husk and red mud.

15. A method of manufacturing a composite material using a reaction product produced from a solid state reaction between a first raw material, having a first concentration of M and a second raw material, having a second concentration of Me, said method of manufacturing a composite material comprising:
introducing a liquid solvent into pores of a solid body that includes the reaction product, wherein the reaction product includes at least one synthetic formulation having the general formula $M_aMe_bO_c$, $M_aMe_b(OH)_d$, $M_aMe_bO_c(OH)_d$ or $M_aMe_bO_c(OH)_d \cdot (H_2O)_e$, wherein M comprises at least one metal that can react to form a carbonate and Me is at least one element that can form an oxide during the carbonation reaction, wherein the ratio of a:b is between 0.167:1 and 2.5:1, wherein c is 3 or greater, wherein d is 1 or greater, wherein e is 0 or greater, wherein the at least one synthetic formulation undergoes the carbonation reaction, and wherein the at least one synthetic formulation undergoes a volume change during the carbonation reaction; and
introducing a gaseous reactant into the pores of the solid body, whereby particles of the at least one synthetic formulation are transformed into bonding elements that comprise:
a core having a first chemical composition that includes one or more chemical elements;
a first layer at least partially covering a peripheral portion of the core, the first layer having a second chemical composition different than the first chemical composition, the second chemical composition including cations corresponding to one of the chemical elements of the first chemical composition; and a second layer at least partially covering a peripheral portion of the first layer, the second layer having a third chemical composition different than the first and second chemical compositions, the third chemical composition including cations corresponding to one of the chemical elements of the first chemical composition.

16. The method of claim 15, wherein the at least one synthetic formulation undergoes volume expansion during the carbonation reaction.

17. The method of claim 15, wherein M comprises an alkaline earth element.

18. The method of claim 15, wherein Me is selected from the group of elements consisting of silicon, titanium, aluminum, phosphorous, vanadium, tungsten, molybdenum, gallium, manganese, zirconium, germanium, copper, niobium, cobalt, lead, iron, indium, arsenic, sulfur, sodium, potassium, boron and tantalum.

19. The method of claim 15, wherein the first raw material is a calcium-rich mineral selected from the group of minerals consisting of Aragonite, Calcite, Dolomite, Gypsum, Marl, Chlorites, Sulfates and Limestone.

20. The method of claim 15, wherein the second raw material is a silicon-rich mineral selected from the group consisting of Silicate, Zeolite, Shale, Slate, Clay, Argillite, Sandstone, Conglomerate, Basalt, Feldspar, Mica, Granite, Granodiorite, Diorite, Chert, Sand and Amorphous Silicate.

* * * * *